US012107648B2

(12) United States Patent
Fang (10) Patent No.: US 12,107,648 B2
(45) Date of Patent: Oct. 1, 2024

(54) METHOD FOR FEEDING BACK AND RECEIVING INFORMATION, AND DEVICE

(71) Applicant: GUANGDONG OPPO MOBILE TELECOMMUNICATIONS CORP., LTD., Dongguan (CN)

(72) Inventor: Yun Fang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 627 days.

(21) Appl. No.: 17/209,020

(22) Filed: Mar. 22, 2021

(65) Prior Publication Data

US 2021/0211175 A1 Jul. 8, 2021

Related U.S. Application Data

(63) Continuation of application No. PCT/CN2018/107124, filed on Sep. 21, 2018.

(51) Int. Cl.
*H04B 7/06* (2006.01)
*H04L 5/00* (2006.01)

(52) U.S. Cl.
CPC ........ *H04B 7/0626* (2013.01); *H04L 5/0048* (2013.01)

(58) Field of Classification Search
CPC .. H04B 7/0626; H04B 7/0456; H04B 7/0619; H04B 7/04; H04L 5/0048; H04L 5/00; H04L 1/0026; H04L 5/0053; H04W 72/0466; H04W 52/143; H04W 72/0446; H04W 52/48
See application file for complete search history.

(56) References Cited

U.S. PATENT DOCUMENTS

| 8,675,794 B1* | 3/2014 | Perets | H04L 1/0026 |
| | | | 375/264 |
| 9,590,713 B2* | 3/2017 | Davydov | H04L 5/00 |
| 2013/0230006 A1* | 9/2013 | Kotecha | H04W 72/0466 |
| | | | 370/329 |
| 2017/0063503 A1* | 3/2017 | Liu | H04L 5/0048 |
| 2017/0164301 A1* | 6/2017 | Jeon | H04W 52/143 |

(Continued)

FOREIGN PATENT DOCUMENTS

| CN | 102026280 A | * | 4/2011 | |
| CN | 105099967 A | * | 11/2015 | H04B 7/0619 |

(Continued)

OTHER PUBLICATIONS

Guangdong OPPO Mobile Telecommunications Corp., Ltd., International Search Report and Written Opinion, PCT/CN2018/107124, Feb. 28, 2019, 17 pgs.

(Continued)

*Primary Examiner* — Ayaz R Sheikh
*Assistant Examiner* — Louis Samara
(74) *Attorney, Agent, or Firm* — Morgan, Lewis & Bockius LLP (57) ABSTRACT

Provided are a method for feeding back and receiving information, and a device. The method comprises: a terminal device determines channel state information (CSI); the terminal device sends the CSI to a network device. In embodiments of the present application, quick feedback of the CSI by the terminal device can effectively reduce feedback overhead, thereby improving the reliability of a control channel.

17 Claims, 2 Drawing Sheets

(56) References Cited

U.S. PATENT DOCUMENTS

| | | | |
|---|---|---|---|
| 2018/0092080 A1* | 3/2018 | Kim | H04L 5/0053 |
| 2019/0053171 A1* | 2/2019 | Jung | H04W 52/48 |
| 2019/0116602 A1* | 4/2019 | Zhang | H04W 72/0446 |
| 2020/0028609 A1* | 1/2020 | Ahn | H04L 1/00 |

FOREIGN PATENT DOCUMENTS

| | | | | |
|---|---|---|---|---|
| CN | 111034249 A * | 4/2020 | | H04B 17/345 |
| CN | 110050413 B * | 5/2023 | | H04B 7/04 |
| WO | WO-2018143527 A1 * | 8/2018 | | H04B 7/0456 |
| WO | WO-2020056775 A1 * | 3/2020 | | H04B 7/0626 |

OTHER PUBLICATIONS

Guangdong OPPO Mobile Telecommunications Corp., Ltd., Extended European Search Report, EP18934503.6, Sep. 9, 2021, 9 pgs.

LG Electronics, "UL channel utilization for CSI reporting," 3GPP TSG RAN WG1 NR Ad-Hoc#2, R1-1710290, Qingdao, P.R. China, Jun. 27-30, 2017, 3 pgs.

* cited by examiner

METHOD FOR FEEDING BACK AND RECEIVING INFORMATION, AND DEVICE

CROSS-REFERENCE TO RELATED APPLICATION

This application is a continuation application of PCT Application No. PCT/CN2018/107124, filed Sep. 21, 2018, the entire contents of which is incorporated herein by reference.

TECHNICAL FIELD

Embodiments of the application relate to the field of communications, and more specifically, to methods and devices for feeding back information and receiving information.

BACKGROUND

Ultra-reliable and low-latency communication (URLLC) service is introduced in 5G NR. In order to improve transmission efficiency of URLLC and avoid system congestion, and thereby ensuring that transmission can be correctly performed with limited retransmission opportunities, a method that can reduce feedback overhead is urgently needed.

SUMMARY

There are provided methods and devices for feeding back information and receiving information, thereby reducing feedback overhead and improving reliability of the control channel.

According to a first aspect, there is provided a method for feeding back information, including:
  determining, by a terminal device, channel state information (CSI); and
  sending, by the terminal device, the CSI to a network device.

In some possible embodiments, the determining, by the terminal device, the CSI includes:
  determining, by the terminal device, the CSI according to downlink data.

In some possible embodiments, the determining, by the terminal device, the CSI according to the downlink data includes:
  determining, by the terminal device, a modulation and coding scheme (MCS) level of the downlink data; and
  determining, by the terminal device, the CSI according to the MCS level of the downlink data.

In some possible embodiments, wherein the determining, by the terminal device, the CSI according to the MCS level of the downlink data includes:
  determining, by the terminal device, a target MCS level;
  determining, by the terminal device, a first difference value between the MCS level of the downlink data and the target MCS level; and
  determining, by the terminal device, the CSI according to the first difference value.

In some possible embodiments, the determining, by the terminal device, the target MCS level includes:
  determining, by the terminal device, the target MCS level by measuring a demodulation reference signal (DMRS), or a channel state information reference signal (CSIRS), or demodulation and decoding information.

In some possible embodiments, before the determining, by the terminal device, the CSI according to the first difference value, the method further includes:
  acquiring, by the terminal device, a difference value set; and
  wherein the determining, by the terminal device, the CSI according to the first difference value includes:
  determining, by the terminal device, the CSI according to the difference value set and the first difference value.

In some possible embodiments, the difference value set includes a difference value between the target MCS level and the MCS level of the downlink data, and wherein the determining, by the terminal device, the CSI according to the difference value set and the first difference value includes:
  determining, by the terminal device, the CSI including the first difference value.

In some possible embodiments, the difference value set does not include a difference value between the target MCS level and the MCS level of the downlink data, and wherein the determining, by the terminal device, the CSI according to the difference value set and the first difference value includes:
  determining, by the terminal device, the CSI including a value in the difference value set closest to the first difference value.

In some possible embodiments, the receiving, by the terminal device, a difference value set sent by the network device includes:
  acquiring, by the terminal device, the difference value set through a high layer signaling.

In some possible embodiments, the determining, by the terminal device, the MCS level of the downlink data includes:
  receiving, by the terminal device, first indication information sent by the network device; and
  determining, by the terminal device, the MCS level of the downlink data according to the first indication information.

In some possible embodiments, the receiving, by the terminal device, the first indication information sent by the network device includes:
  receiving, by the terminal device, downlink control information (DCI) of the downlink data sent by the network device, wherein the DCI of the downlink data includes the first indication information; or
  receiving, by the terminal device, a high layer signaling sent by the network device, wherein the high layer signaling includes the first indication information.

In some possible embodiments, before the determining, by the terminal device, the CSI, the method further includes:
  acquiring, by the terminal device, a report set.

In some possible embodiments, the acquiring, by the terminal device, the report set includes:
  receiving, by the terminal device, a physical layer signaling sent by the network device, wherein the physical layer signaling includes the report set; or
  receiving, by the terminal device, a high layer signaling sent by the network device, wherein the high layer signaling includes the report set.

In some possible embodiments, the CSI includes a channel quality indicator (CQI).

In some possible embodiments, a difference value between a channel difference corresponding to a step size of a CQI index and a channel difference corresponding to a step size of an MCS index is less than or equal to a preset threshold.

In some possible embodiments, the preset threshold is zero.

In some possible embodiments, the step size of the CQI index is equal to the step size of the MCS index.

According to a second aspect, there is provided a method for receiving information, including:

sending, by a network device, downlink data to a terminal device; and receiving, by the network device, channel state information (CSI) sent by the terminal device.

In some possible embodiments, before the receiving, by the network device, the CSI sent by the terminal device, the method further includes:

sending, by the network device, a difference value set to the terminal device, wherein the difference value set is used by the terminal device to determine a first difference value, the first difference value being a difference value between an MCS level of the downlink data and an MCS level determined by the terminal device.

In some possible embodiments, the CSI includes the first difference value.

In some possible embodiments, the CSI includes a value in the difference value set closest to the first difference value.

In some possible embodiments, the sending, by the network device, the difference value set to the terminal device includes:

sending, by the network device, the difference value set to the terminal device through a high layer signaling.

In some possible embodiments, before the receiving, by the network device, the CSI sent by the terminal device, the method further includes:

sending, by the network device, first indication information to the terminal device, wherein the first indication information is used by the terminal device to determine the MCS level of the downlink data.

In some possible embodiments, the sending, by the network device, the first indication information to the terminal device includes:

sending, by the network device, downlink control information (DCI) of the downlink data to the terminal device, wherein the DCI of the downlink data includes the first indication information; or sending, by the network device, a high layer signaling of the downlink data to the terminal device, wherein the high layer signaling includes the first indication information.

In some possible embodiments, before the receiving, by the network device, the CSI sent by the terminal device, the method further includes:

sending, by the network device, a report set to the terminal device.

In some possible embodiments, the sending, by the network device, the report set to the terminal device includes:

sending, by the network device, a physical layer signaling to the terminal device, wherein the physical layer signaling includes the report set; or sending, by the network device, a high layer signaling to the terminal device, wherein the high layer signaling includes the report set.

In some possible embodiments, the CSI includes a channel quality indicator (CQI).

In some possible embodiments, a difference value between a channel difference corresponding to a step size of a CQI index and a channel difference corresponding to a step size of an MCS index is less than or equal to a preset threshold.

In some possible embodiments, the preset threshold is zero.

In some possible embodiments, the step size of the CQI index is equal to the step size of the MCS index.

According to a third aspect, there is provided a communication device configured to perform the method according to any one of the first to second aspects or any one of the possible embodiments thereof.

In some possible embodiments, the communication device includes:

a functional module, configure to perform the method according to any one of the first to second aspects or any one of the possible embodiments thereof.

In some possible embodiments, the communication device is a terminal device, and the terminal device is configured to perform the method according to the first aspect or any one of the possible embodiments thereof.

In some possible embodiments, the communication device is a network device, and the network device is configured to perform the method according to the second aspect or any one of the possible embodiments thereof.

According to a fourth aspect, there is provided a communication device, including:

a processor, configured to call and run a computer program from a memory, and the computer program is used for implementing the method according to any one of the first to second aspects or any one of the possible embodiments thereof.

In some possible embodiments, the communication device further includes:

a memory, configured to store the computer program.

In some possible embodiments, the communication device is a terminal device, and the terminal device is configured to perform the method according to the first aspect or any one of the possible embodiments thereof.

In some possible embodiments, the communication device is a network device, and the network device is configured to perform the method according to the second aspect or any one of the possible embodiments thereof.

According to a fifth aspect, there is provided a chip configured to perform the method according to any one of the first to second aspects or any one of the possible embodiments thereof.

In some possible embodiments, the chip includes:

a processor, configured to call and run a computer program from a memory, and the computer program is used for implementing the method according to any one of the first to second aspects or any one of the possible embodiments thereof.

In some possible embodiments, the chip further includes:

a memory, configured to store the computer program.

According to a sixth aspect, there is provided a computer-readable storage medium, wherein the storage medium is configured to store a computer program used for implementing the method according to any one of the first to second aspects or any one of the possible embodiments thereof.

According to a seventh aspect, there is provided a computer program product including computer program instructions, wherein the computer program is used for implementing the method according to any one of the first to second aspects or any one of the possible embodiments thereof.

According to an eighth aspect, there is provided a computer program product that, when running on a computer, causes the computer to perform the method according to any one of the first to second aspects or any one of the possible embodiments thereof.

According to a ninth aspect, there is provided a communication system including the terminal device and the network device.

In some possible embodiments, the terminal device is configured to perform the method according to the first aspect or any one of the possible embodiments thereof, and the network device is configured to perform the method according to the second aspect or any one of the possible embodiments thereof.

Based on the above technical solution, the feedback overhead can be effectively reduced and the reliability of the control channel can be improved by quickly feeding back the CSI from the terminal device.

DETAILED DESCRIPTION

The technical solution according to the embodiments of the application will be described below with reference to the drawings in some embodiments of the application. Obviously, the described embodiments are part of the embodiments of the application, but not all of the embodiments. Based on the embodiments in the application, all other embodiments acquired by a person of ordinary skill in the art without creative efforts shall fall within the protection scope of the application.

Figure 1:
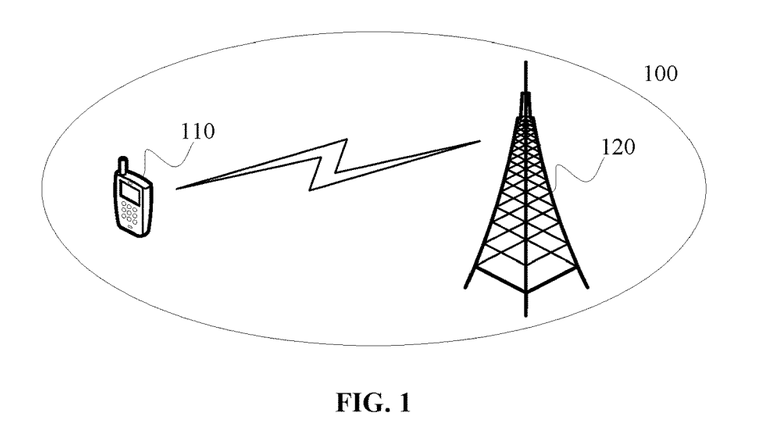
FIG. 1 illustrates an example of an application scenario of the application.

FIG. 1 illustrates an example of an application scenario of the application.

As shown in FIG. 1, the communication system 100 may include a terminal device 110 and a network device 120. The network device 120 may communicate with the terminal device 110 through an air interface. Multi-service transmission is supported between the terminal device 110 and the network device 120.

It should be understood that the embodiments of the application are described by using the communication system 100 as an example, but the embodiments of the application are not limited thereto. In other words, the embodiments of the application can be applied to various communication systems, for example, Global System of Mobile (GSM) communication system, Code Division Multiple Access (CDMA) system, Wideband Code Division Multiple Access (WCDMA) system, General Packet Radio Service (GPRS), Long Term Evolution (LTE) system, LTE Time Division Duplex (TDD) system, Universal Mobile Telecommunication System (UMTS), Worldwide Interoperability for Microwave Access (WiMAX) communication system, New Radio (NR), future 5G system and the like.

Taking the 5G system as an example, the technical solution in the embodiments of the present application can be applied to a wide area long term evolution (LTE) coverage and an island coverage mode of NR. And a lot of LTE is deployed below 6 GHZ, and there is very little spectrum below 6 GHz available for 5G. Therefore, NR must study spectrum applications above 6 GHz, and high-frequency bands have limited coverage and fast signal fading. At the same time, in order to protect mobile operators' early investment in LTE, a tight interworking working mode between LTE and NR is proposed.

The main application scenarios of 5G include: Enhanced Mobile Broadband (eMBB), Ultra-Reliable and Low Latency Communication (URLLC), Mass Machine Type Communication (mMTC). Among them, eMBB aims to obtain multimedia content, services, and data for users, and its demand has grown rapidly. Because eMBB may be deployed in different scenarios, for example, indoors, urban areas, and rural areas, they may have large differences in capabilities and needs, so they cannot be generalized, and detailed analysis should be performed with specific deployment scenarios. Typical applications of URLLC include: industrial automation, power automation, telemedicine operations (e.g., surgery), traffic safety assurance, and the like. Typical characteristics of mMTC include: high connection density, small data volume, delay-insensitive services, low cost of modules, long service life and the like.

In addition, since complete 5G NR coverage is difficult to obtain, the network coverage in the embodiments of the application may adopt a wide area LTE coverage and an NR island coverage mode. At the same time, in order to protect the mobile operator's early investment in LTE, it is possible to further adopt a tight interworking working mode between LTE and NR.

In particular, the technical solutions of the embodiments of the application can be applied to various communication systems based on non-orthogonal multiple access technologies, for example, a Sparse Code Multiple Access (SCMA) system, a low density signature (LDS) system, and the like. The SCMA system and LDS system can also be referred to as other names in the field of communication. Moreover, the technical solution of the embodiments of this application can be applied to multi-carrier transmission systems based on non-orthogonal multiple access technologies, for example, Orthogonal Frequency Division Multiplexing (OFDM), Filter Bank Multi-Carrier (FBMC), Generalized Frequency Division Multiplexing (GFDM), Filtered-OFDM (F-OFDM) systems, and the like.

In the communication system 100 shown in FIG. 1, the network device 120 may be an access network device that communicates with the terminal device 110. The access network device can provide communication coverage for a specific geographic area, and can communicate with the terminal device 110 (e.g., a UE) located within the coverage area.

Optionally, the network device 110 may be a base transceiver station (BTS) in the GSM system or CDMA system, or a NodeB (NB) in the WCDMA system, or an evolutional Node B (eNB or eNodeB) in the LTE system. Optionally, the network device may also be a base station (gNB) in Next Generation Radio Access Network (NGRAN) or the NR system, or a radio controller in Cloud Radio Access Network (CRAN). Also, the access network device may be a relay station, access point, in-vehicle device, wearable device, hub, switch, bridge, router, or network device in future-evolved public land mobile network (PLMN).

Optionally, the terminal device 110 may be any terminal device, including but not limited to, connection via wired lines, such as public switched telephone networks (PSTN), digital subscriber lines (DSL), digital cables, direct cable connections; and/or another data connection/network; and/or connection via a wireless interface, such as cellular networks, wireless local area networks (WLAN), digital television networks such as DVB-H networks, satellite networks, AM-FM broadcast transmitter; and/or another terminal device configured to receive/transmit communication signals; and/or an Internet of Things (IoT) device. A terminal device configured to communicate through the wireless interface may be referred to as a "wireless communication terminal", a "wireless terminal", or a "mobile terminal". Examples of mobile terminals include, but are not limited to, satellite or cellular phones; personal communication system (PCS) terminals that can combine cellular radiotelephones, data processing, facsimile, and data communications capabilities; PDA that can combine radiotelephones, pagers, Internet/Intranet access, Web browser, notepad, calendar, and/or Global Positioning System (GPS) receiver; and conventional laptop and/or palm-type receivers or other electronic devices including radiotelephone transceivers. The terminal device may be referred to as an access terminal, user equipment (UE), user unit, user station, mobile station, mobile site, remote station, remote terminal, mobile device, user terminal, terminal, wireless communication device, user agent, or user device. The access terminal can be a cellular phone, a cordless phone, a Session Initiation Protocol (SIP) phone, a Wireless Local Loop (WLL) station, a Personal Digital Processing (PDA), handheld devices with wireless communication function, computing devices, or other processing devices connected to a wireless modem, in-vehicle devices, wearable devices, terminal devices in the 5G network, terminal devices in a future-evolved PLMN, and the like.

Optionally, D2D (Device to Device) communication can be performed between terminal devices 110.

FIG. 1 exemplarily illustrates one network device and two terminal devices. Optionally, the communication system 100 may include multiple network devices and the coverage of each network device may include other numbers of terminal devices. The embodiments are not limited thereto.

Optionally, the communication system 100 may further include other network entities such as a network controller, a mobility management entity, and the like, the embodiments of the application are not limited thereto.

It should be understood that the terms "system" and "network" are often used interchangeably herein. The term "and/or" in this document is only a kind of association relationship describing related objects, which means that there can be three kinds of relationships, for example, A and/or B may refer to three cases: A exists alone, A and B exist simultaneously, or B exists alone. In addition, the character "/" in this article generally indicates that the related objects are in an "or" relationship.

Figure 2:
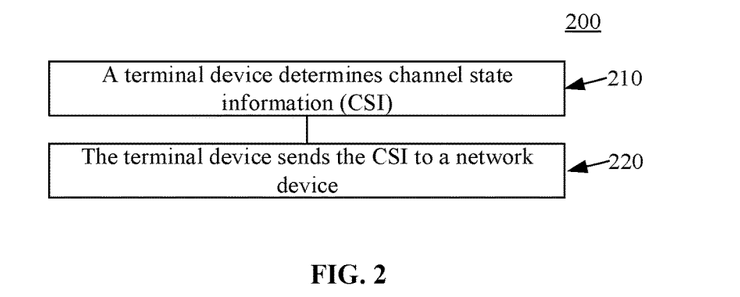
FIG. 2 is a schematic flowchart illustrating a method for feedback information according to an embodiment of the application.

FIG. 2 is a schematic flowchart illustrating a method 200 for feeding back information according to an embodiment of the application. The method 200 may be performed by a terminal device. The terminal device shown in FIG. 2 may be the terminal device shown in FIG. 1, and the network device shown in FIG. 2 may be the access network device shown in FIG. 1. The method 200 includes part or all of the following.

As shown in FIG. 2, the method 200 includes following steps.

In 210, the terminal device determines channel state information (CSI).

In 220, the terminal device sends the CSI to the network device.

According to embodiments of the application, the feedback overhead can be effectively reduced and the reliability of the control channel can be improved by quickly feeding back the CSI from the terminal device.

Specific embodiments of determining the CSI by the terminal device are described in detail below.

Optionally, in some embodiments of the application, the terminal device determines the CSI according to downlink data.

Optionally, in some embodiments of the application, the terminal device determines a modulation and coding scheme (MCS) level of the downlink data; and determines the CSI according to the MCS level of the downlink data.

Optionally, in some embodiments of the application, the terminal device determines a target MCS level; determines a first difference value between the MCS level of the downlink data and the target MCS level; and determines the CSI according to the first difference value.

According to the embodiments of the application, feedback overhead can be effectively reduced by feeding back the first difference value, thereby improving user experience.

It should be understood that it is only an exemplary description for the terminal device to determine the CSI according to the first difference value, and the embodiments of the application are not limited thereto. For example, in other alternative embodiments, the terminal device may also determine the CSI according to a second difference value, wherein the second difference value may be a difference value between the target MCS level and a fixed MCS level. Optionally, the fixed MCS level may be a preset MCS level. As another example, in other alternative embodiments, the terminal device may also determine the CSI according to a third difference value. Optionally, the third difference value may be a difference value between the target MCS/CQI and a recently reported CQI. Optionally, the third difference value may also be a difference value between the target MCS/CQI and a recently reported periodic CQI.

Optionally, in some embodiments of the application, the terminal device determines the target MCS level by measuring a demodulation reference signal (DMRS), or a channel state information reference signal (CSIRS), or demodulation and decoding information.

Optionally, in some embodiments of the application, before determining, by the terminal device, the CSI according to the first difference value, the terminal device acquires a difference value set; and determines the CSI according to the difference value set and the first difference value.

Optionally, in some embodiments of the application, the difference value set includes a difference value between the target MCS level and the MCS level of the downlink data, the terminal device determines the CSI including the first difference value.

For example, it is assumed that the difference value set is {0, −1, −3, −8}, the MCS level of the downlink data is 5, and the target MCS level is 4. Then the difference value between the target MCS level and the MCS level of the downlink data is −1. Therefore, the CSI includes −1, that is, the CSI includes the first difference value.

Optionally, in some embodiments of the application, the difference value set does not include a difference value between the target MCS level and the MCS level of the downlink data, the terminal device determines the CSI including a value in the difference value set closest to the first difference value.

For example, it is assumed that the difference value set is {0, −1, −3, −8}, the MCS level of the downlink data is 5, and the target MCS level is 6. Then, the difference value between the target MCS level and the MCS level of the downlink data is 1. Therefore, the CSI may include the first difference value. Moreover, the first difference value may be 0. In other words, the first difference value may be determined as the highest MCS corresponding item in the difference value set.

For example, it is assumed that the difference value set is {0, −1, −3, −8}, the MCS level of the downlink data is 5, and the target MCS level is 6. Then, the difference value between the target MCS level and the MCS level of the downlink data is 1. Therefore, the CSI may include the first difference value. Moreover, the first difference value may be 0. In other words, the first difference value may be determined as the value in the difference value set that is the closet to the first difference value.

It should be understood that, in the embodiments of the application, the CSI may include a specific value of the first difference value, or an index of the first difference value, which is not specifically limited in the embodiments of the application.

Optionally, in some embodiments of the application, the terminal device acquires the difference value set through a high layer signaling.

Optionally, in some embodiments of the application, the terminal device receives first indication information sent by the network device; and determines the MCS level of the downlink data according to the first indication information.

Optionally, in some embodiments of the application, the terminal device receives downlink control information (DCI) of the downlink data sent by the network device, and the DCI of the downlink data includes the first indication information; or the terminal device receives a high layer signaling sent by the network device, wherein the high layer signaling includes the first indication information.

Optionally, in some embodiments of the application, the DCI of the downlink data includes dynamic scheduling DCI and/or semi-persistent scheduling DCI.

Optionally, in some embodiments of the application, the terminal device receives a high layer signaling of the downlink data sent by the network device, and the high layer signaling includes the first indication information.

Optionally, in some embodiments of the application, the CSI includes a channel quality indicator (CQI).

Optionally, in some embodiments of the application, a difference value between a channel difference corresponding to a step size of a CQI index and a channel difference corresponding to a step size of an MCS index is less than or equal to a preset threshold.

Optionally, in some embodiments of the application, the preset threshold is zero.

In other words, the channel difference corresponding to the step size of the CQI index is equal to the channel difference corresponding to the step size of the MCS index. For example, it is assumed that the CQI index includes index 0 to index 15, where the index step size is 1. It is assumed that the CQI index includes index 0 to index 31, where the index step size is 1. Further, when the index step size is 1, it corresponds to 1.5 db.

Optionally, in some embodiments of the application, step size of the CQI index is equal to the step size of the MCS index.

Optionally, in some embodiments of the application, before the terminal device determines the CSI, the terminal device receives configuration information sent by the network device, where the configuration information is used for configuring a time domain resource of the CSI.

Optionally, in some embodiments of the application, the terminal device receives a high layer signaling sent by the network device, and the high layer signaling includes the configuration information.

Optionally, in some embodiments of the application, the terminal device receives a physical layer signaling sent by the network device, and the physical layer signaling includes the configuration information.

Embodiments of the application further provides a method for a network device to configure a report set for a terminal device. Specifically, before the terminal device determines the CSI, the terminal device needs to obtain a report set. In other words, before the network device receives the CSI sent by the terminal device, the network device may send a report set to the terminal device.

It should be understood that the report set may be the difference value set mentioned above, or may be a set of other reporting information. For example, the report set may include a difference value set between a first MCS level and a second MCS level, where the first MCS level may be a preset MCS level or a MCS level of downlink data. As another example, the report set may directly include information such as CQI.

Optionally, in some embodiments of the application, the terminal device receives a physical layer signaling sent by the network device, and the physical layer signaling includes the report set.

Optionally, in some embodiments of the application, the terminal device receives a high layer signaling sent by the network device, and the high layer signaling includes the report set.

Some preferred embodiments of the application have been described in detail above with reference to the accompanying drawings. However, the application is not limited to the specific details in the foregoing embodiments. Within the scope of the technical concept of the application, various simple modifications can be made to the technical solution of the application without going beyond the protection scope of this application.

For example, the various specific technical features described in the above specific modifications can be combined in any suitable manner if there is no contradiction. In order to avoid unnecessary repetition, this application does not provide any detailed explanation for those possible combinations separately.

For another example, various embodiments of the application may also be arbitrarily combined, as long as it does not violate the concept of the application, which should also be regarded as the content disclosed in the application.

It should be understood that, in the various method embodiments of the application, the size of the sequence numbers of the above processes does not mean the order of execution. The execution order of each process should be determined by its function and internal logic, and should not constitute any limitation on implementation process of embodiments of the application.

The method according to the embodiments of the application is described in detail above from the perspective of feeding back information from the terminal device with reference to FIG. 2. The method according to the embodiments of the application from the perspective of receiving the feedback information at the network device will be described below with reference to FIG. 3.

Figure 3:
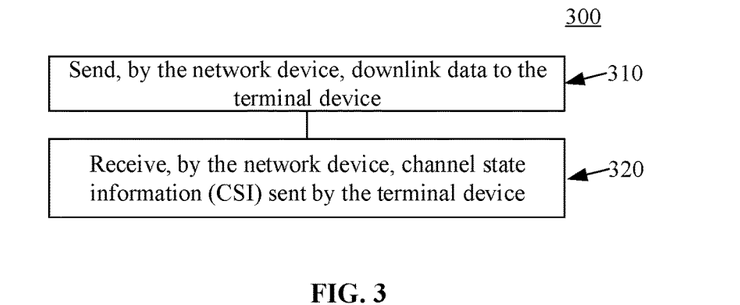
FIG. 3 is a schematic flowchart illustrating a method for receiving information according to an embodiment of the application.

FIG. 3 is a schematic flowchart illustrating a method 300 for receiving information by a network device according to an embodiment of the application. The method 300 may be performed by an access network device as shown in FIG. 1. As shown in FIG. 2, the method 200 includes following steps.

In 310, the network device sends downlink data to the terminal device.

In 320, the network device receives CSI sent by the terminal device.

Optionally, in some embodiments of the application, before the network device receives the CSI sent by the terminal device, the network device sends a difference value set to the terminal device, where the difference value set is used by the terminal device to determine a first difference value, and the first difference value is a difference value between an MCS level of the downlink data and an MCS level determined by the terminal device.

Optionally, in some embodiments of the application, the CSI includes the first difference value.

Optionally, in some embodiments of the application, the CSI includes a value in the difference value set that is closest to the first difference value.

Optionally, in some embodiments of the application, the network device sends the difference value set to the terminal device through a high layer signaling.

Optionally, in some embodiments of the application, before the network device receives the CSI sent by the terminal device, the network device sends first indication information to the terminal device, and the first indication information is used by the terminal device to determine the MCS level of the downlink data.

Optionally, in some embodiments of the application, the network device sends downlink control information (DCI) of the downlink data to the terminal device, and the DCI of the downlink data includes the first indication information; or the network device sends a high layer signaling of the downlink data to the terminal device, where the high layer signaling includes the first indication information.

Optionally, in some embodiments of the application, before the network device receives the CSI sent by the terminal device, the method further includes:
the network device sends a report set to the terminal device.

Optionally, in some embodiments of the application, the sending, by the network device, a report set to the terminal device includes:
sending, by the network device, a physical layer signaling to the terminal device, where the physical layer signaling includes the report set; or
sending, by the network device, a high layer signaling to the terminal device, where the high layer signaling includes the report set.

Optionally, in some embodiments of the application, the CSI includes a channel quality indicator (CQI).

Optionally, in some embodiments of the application, a difference value between a channel difference corresponding to a step size of a CQI index and a channel difference corresponding to a step size of an MCS index is less than or equal to a preset threshold.

Optionally, in some embodiments of the application, the preset threshold is zero.

Optionally, in some embodiments of the application, the step size of the CQI index is equal to the step size of the MCS index.

It should be understood that, for the steps in the method 300 for receiving information by the network device, reference may be made to the corresponding steps in the method 200 for feeding back information by the terminal device.

The method embodiments of the application are described in detail above with reference to FIGS. 1 to 3, and the device embodiments of the application are described in detail below with reference to FIGS. 4 to 6.

Figure 4:
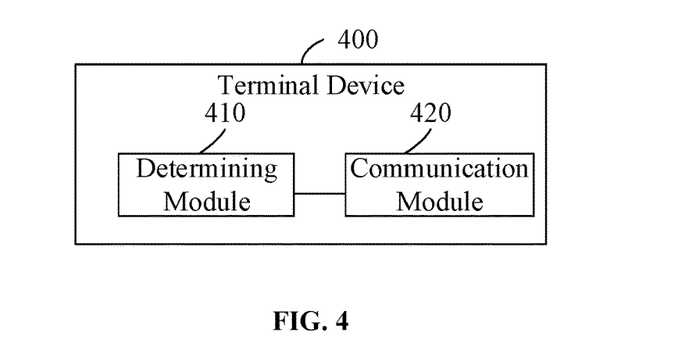
FIG. 4 is a schematic block diagram illustrating a terminal device according to an embodiment of the application.

FIG. 4 is a schematic block diagram of a terminal device 400 according to an embodiment of the application.

Specifically, as shown in FIG. 4, the terminal device 400 may include:
a determining module 410, configured to determine CSI; and
a communication module 420, configured to send the CSI to a network device.

Optionally, in some embodiments of the application, the determining module 410 is specifically configured to:
determine the CSI according to downlink data.

Optionally, in some embodiments of the application, the determining module 410 is more specifically configured to:
determine an MCS level of the downlink data; and determine the CSI according to the MCS level of the downlink data.

Optionally, in some embodiments of the application, the determining module 410 is more specifically configured to:
determine a target MCS level; determine a first difference value between the MCS level of the downlink data and the target MCS level; and determine the CSI according to the first difference value.

Optionally, in some embodiments of the application, the determining module 410 is more specifically configured to:
determine the target MCS level by measuring a DMRS, or a CSIRS, or demodulation and decoding information.

Optionally, in some embodiments of the application, the communication module 420 is further configured to:
acquire a difference value set; and the determining module 410 is specifically configured to:
determine the CSI according to the difference value set and the first difference value.

Optionally, in some embodiments of the application, the difference value set includes a difference value between the target MCS level and the MCS level of the downlink data, and the determining module 410 is more specifically configured to:
determine the CSI including the first difference value.

Optionally, in some embodiments of the application, the difference value set does not include a difference value between the target MCS level and the MCS level of the downlink data, and the determining module 410 is more specifically configured to:
determine the CSI including a value in the difference value set closest to the first difference value.

Optionally, in some embodiments of the application, the communication module 420 is more specifically configured to:
acquire the difference value set through a high layer signaling.

Optionally, in some embodiments of the application, the communication module 420 is further configured to:
receive first indication information sent by the network device; and the determining module 410 is specifically configured to:
determine the MCS level of the downlink data according to the first indication information.

Optionally, in some embodiments of the application, the communication module 420 is specifically configured to:

receive DCI of the downlink data sent by the network device, wherein the DCI of the downlink data includes the first indication information; or receive a high layer signaling sent by the network device, wherein the high layer signaling includes the first indication information.

Optionally, in some embodiments of the application, before the determining module 410 determines the CSI, the communication module 420 is further configured to: acquire a report set.

Optionally, in some embodiments of the application, the communication module 420 is specifically configured to:

receive a physical layer signaling sent by the network device, wherein the physical layer signaling includes the report set; or receive a high layer signaling sent by the network device, wherein the high layer signaling includes the report set.

Optionally, in some embodiments of the application, the CSI includes a CQI.

Optionally, in some embodiments of the application, a difference value between a channel difference corresponding to a step size of a CQI index and a channel difference corresponding to a step size of an MCS index is less than or equal to a preset threshold.

Optionally, in some embodiments of the application, the preset threshold is zero.

Optionally, in some embodiments of the application, the step size of the CQI index is equal to the step size of the MCS index.

It should be understood that the device embodiments and the method embodiments may correspond to each other, and similar descriptions may refer to the method embodiments. Specifically, the terminal device 400 shown in FIG. 4 may correspond to a corresponding subject for performing the method 200 according to the embodiments of the application. The foregoing and other operations and/or functions of each unit in the terminal device 400 are respectively used for performing corresponding process in the method as shown in FIG. 1. For the sake of brevity, the corresponding processes in each method are not repeated here.

Figure 5:
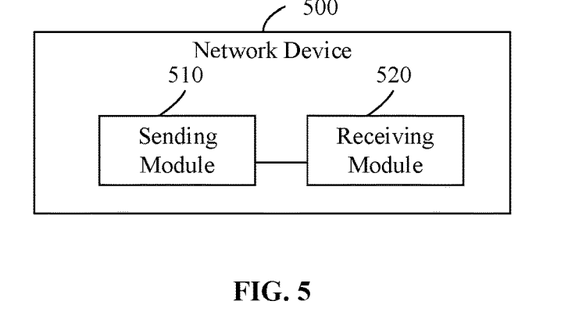
FIG. 5 is a schematic block diagram illustrating a network device according to an embodiment of the application.

FIG. 5 is a schematic block diagram of a network device 500 according to an embodiment of the application.

As shown in FIG. 5, the network device 500 may include:

a sending module 510, configured to send downlink data to a terminal device; and a receiving module 520, configured to CSI sent by the terminal device.

Optionally, in some embodiments of the application, before the receiving module 520 receives the CSI sent by the terminal device, the sending module 510 is further configured to:

send a difference value set to the terminal device, wherein the difference value set is used by the terminal device to determine a first difference value, the first difference value being a difference value between an MCS level of the downlink data and an MCS level determined by the terminal device.

Optionally, in some embodiments of the application, the CSI includes the first difference value.

Optionally, in some embodiments of the application, the CSI includes a value in the difference value set that is closest to the first difference value.

Optionally, in some embodiments of the application, the sending module 510 is specifically configured to:

send the difference value set to the terminal device through a high layer signaling.

Optionally, in some embodiments of the application, before the receiving module 520 receives the CSI sent by the terminal device, the sending module 510 is further configured to:

send first indication information to the terminal device, wherein the first indication information is used by the terminal device to determine the MCS level of the downlink data.

Optionally, in some embodiments of the application, the sending module 510 is specifically configured to:

send DCI of the downlink data to the terminal device, wherein the DCI of the downlink data includes the first indication information; or send a high layer signaling of the downlink data to the terminal device, wherein the high layer signaling includes the first indication information.

Optionally, in some embodiments of the application, before the receiving module 510 receives the CSI sent by the terminal device, the sending module 520 is further configured to:

send a report set to the terminal device.

Optionally, in some embodiments of the application, the sending module 520 is specifically configured to:

send a physical layer signaling to the terminal device, wherein the physical layer signaling includes the report set; or send a high layer signaling to the terminal device, wherein the high layer signaling includes the report set.

Optionally, in some embodiments of the application, the CSI includes a CQI.

Optionally, in some embodiments of the application, a difference value between a channel difference corresponding to a step size of a CQI index and a channel difference corresponding to a step size of an MCS index is less than or equal to a preset threshold.

Optionally, in some embodiments of the application, the preset threshold is zero.

Optionally, in some embodiments of the application, the step size of the CQI index is equal to the step size of the MCS index.

The communication devices according to the embodiments of the application have been described above with reference to FIGS. 4 and 5 from the perspective of functional modules. It should be understood that the functional modules may be implemented by hardware, or by instructions in software, or by a combination of hardware and software modules.

Specifically, each step of the method according to the embodiments of the application may be completed by hardware integrated logic circuits and/or software instructions in the processor, and the steps of the method disclosed in the embodiments of the application may be directly embodied as execution of a decoding processor, or execution of a combination of hardware and software modules in the decoding processor.

Optionally, the software module may be located in a mature storage medium in the art such as a random access memory, a flash memory, a read-only memory, a programmable read-only memory, an electrically erasable programmable memory, a register, and the like. The storage medium is located in a memory, and the processor reads the information in the memory and completes the steps in the foregoing method embodiment in combination with its hardware.

For example, in some embodiments of the application, the determining module 410 shown in FIG. 4 may be implemented by a processor, the communication module 420 shown in FIG. 4, the sending module 510 shown in FIG. 5 and the receiving module 520 shown in FIG. 5 may be implemented by a transceiver.

Figure 6:
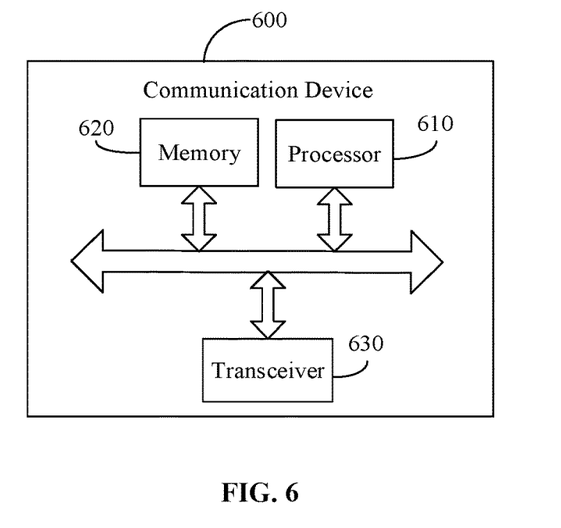
FIG. 6 is a schematic block diagram illustrating a communication device according to an embodiment of the application.

FIG. 6 is a block diagram illustrating a communication device 600 according to an embodiment of the application. The communication device 600 shown in FIG. 6 includes a processor 610, which can call and run a computer program from a memory to implement the method according to the embodiments of the application.

Optionally, as shown in FIG. 6, the communication device 600 may further include a memory 620. The memory 620 may be configured to store instruction information, and may also be configured to store codes, instructions, and the like executed by the processor 610. The processor 610 may call and run the computer program from the memory 620 to implement the method according to the embodiments of the application.

The memory 620 may be a separate device independent of the processor 610, or may be integrated in the processor 610.

Optionally, as shown in FIG. 6, the communication device 600 may further include a transceiver 630, and the processor 610 may control the transceiver 630 to communicate with other devices. Specifically, it may send information or data to other devices, or receive other information, data sent by the device.

The transceiver 630 may include a transmitter and a receiver. The transceiver 630 may further include antennas, and the number of antennas may be one or more.

Optionally, the communication device 600 may be the network device according to an embodiment of the application, and the communication device 600 may implement a corresponding process implemented by the network device in each method according to the embodiments of the application. In other words, the communication device 600 according to the embodiments of the application may correspond to the network device 500 according to the embodiments of the application, and may correspond to the corresponding subject in the method 300 according to the embodiments of the application, which will not be repeated here for the sake of brevity.

Optionally, the communication device 600 may be the terminal device according to an embodiment of the application, and the communication device 600 may implement a corresponding process implemented by the network device in each method according to the embodiments of the application. In other words, the communication device 600 according to the embodiments of the application may correspond to the terminal device 400 according to the embodiments of the application, and may correspond to the corresponding subject in the method 200 according to the embodiments of the application, which will not be repeated here for the sake of brevity.

It should be understood that various components in the communication device 600 are connected through a bus system, where the bus system includes a power bus, a control bus, and a status signal bus in addition to a data bus.

In addition, a chip is provided according to the embodiments of the application. The chip may be an integrated circuit chip with signal processing capabilities, and can implement or execute the methods, steps, and logic block diagrams disclosed in the embodiments of the application.

Optionally, the chip can be applied to various communication devices, so that the communication device installed with the chip can execute the methods, steps and logic block diagrams disclosed in the embodiments of the application.

Figure 7:
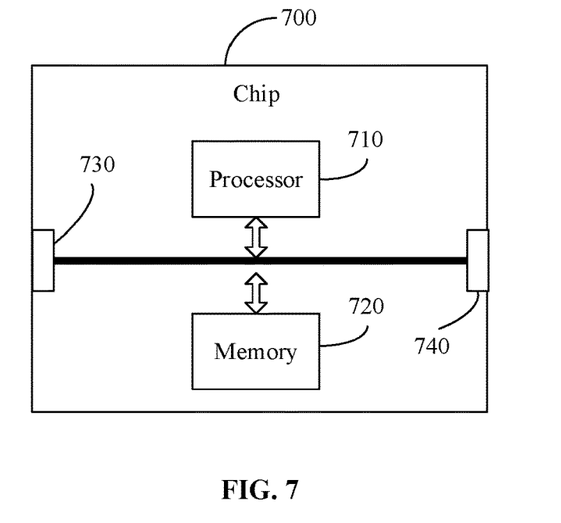
FIG. 7 is a schematic block diagram illustrating a chip according to an embodiment of the application.

FIG. 7 is a block diagram illustrating a chip according to an embodiment of the application.

The chip 700 shown in FIG. 7 includes a processor 710, and the processor 710 can call and run a computer program from a memory to implement the method according to the embodiments of the application.

Optionally, as shown in FIG. 7, the chip 700 may further include a memory 720. The processor 710 may call and run the computer program from the memory 720 to implement the method according to the embodiments of the application. The memory 620 may be configured to store instruction information, and may also be configured to store code, instructions, and the like executed by the processor 610.

The memory 720 may be a separate device independent of the processor 710, or may be integrated in the processor 710.

Optionally, the chip 700 may further include an input interface 730. The processor 710 may control the input interface 730 to communicate with other devices or chips. Specifically, the processor 710 may acquire information or data sent by other devices or chips.

Optionally, the chip 700 may further include an output interface 740. The processor 710 may control the output interface 740 to communicate with other devices or chips. Specifically, the processor 710 may output information or data to the other devices or chips.

Optionally, the chip can be applied to the network device according to the embodiments of the application, and the chip can implement the corresponding process implemented by the network device in the method according to the embodiments of the application. For brevity, details are not described herein.

Optionally, the chip can be applied to the terminal device according to the embodiments of the application, and the chip can implement the corresponding process implemented by the terminal device in the method according to the embodiments of the application. For brevity, details are not described herein.

It should be understood that the chip mentioned in some embodiments of the application may also be referred to as a system-order chip, a system chip, a chip system or a system-on-chip. It should also be understood that various components in the chip 700 are connected by a bus system, where the bus system includes a power bus, a control bus, and a status signal bus in addition to a data bus.

The processor mentioned in some embodiments of the application may be a general-purpose processor, a digital signal processor (DSP), an application specific integrated circuit (ASIC), a field programmable gate array (FPGA), or other programming logic devices, discrete gate or transistor logic devices, discrete hardware components. The general-purpose processor may be a microprocessor or the processor may be any conventional processor or the like.

The memory mentioned in some embodiments of the application may be a volatile memory or a non-volatile memory, or may include both volatile and non-volatile memory. In some embodiments, the non-volatile memory may be read-only memory (ROM), programmable read-only memory (PROM), erasable programmable read-only memory (erasable PROM, EPROM), electrical memory erasable programmable read-only memory (EPROM, EEPROM) or flash memory. The volatile memory may be a random access memory (RAM), which is used as an external cache.

It should be understood that the foregoing memory is exemplary but not restrictive. For example, the memory in the embodiments of the application may also be a static random access memory (static RAM, SRAM), a dynamic random access memory (dynamic RAM, DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synch link dynamic random access memory (synch link DRAM, SLDRAM), and direct Rambus random access memory (direct Rambus RAM, DR RAM) and so on.

A computer-readable storage medium is also provided in some embodiments of the application for storing a computer program.

Optionally, the computer-readable storage medium may be applied to the network device in some embodiments of the application, and the computer program causes the computer to execute the corresponding process implemented by the network device in each method in some embodiments of the application. For the sake of brevity, details will not be repeated here.

Optionally, the computer-readable storage medium may be applied to the mobile terminal/terminal device in some embodiments of the application, and the computer program causes the computer to execute a corresponding process implemented by the mobile terminal/terminal device in each method in some embodiments of the application. For the sake of brevity, details will not be repeated here.

A computer program product is also provided in some embodiments of the application, including computer program instructions.

Optionally, the computer program product can be applied to the network device in some embodiments of the application, and the computer program instruction causes the computer to execute a corresponding process implemented by the network device in each method in some embodiments of the application. For the sake of brevity, details will not be repeated here.

Optionally, the computer program product can be applied to a mobile terminal/terminal device in some embodiments of the application, and the computer program instructions cause the computer to execute a corresponding process implemented by the mobile terminal/terminal device in each method in some embodiments of the application. For the sake of brevity, details will not be repeated here.

A computer program is also provided in some embodiments of the application.

Optionally, the computer program may be applied to a network device in some embodiments of the application. When the computer program is run on a computer, the computer is caused to execute a corresponding process implemented by the network device in each method in some embodiments of the application. For the sake of brevity, details will not be repeated here.

An embodiment of the application further provides a communication system, which includes the terminal device 400 shown in FIG. 4 and the network device 500 shown in FIG. 5. For brevity, it will be not repeated here.

It should also be understood that the terminology used in the embodiments of the application and the appended claims is for the purpose of describing particular embodiments only and is not intended to limit the embodiments of the application.

For example, the singular forms "a", "the", "the above", and "the" used in the examples of the application and the appended claims are also intended to include the plural forms unless the context clearly indicates otherwise meaning.

Those of ordinary skill in the art may realize that the units and algorithm steps of each example described in connection with the embodiments disclosed herein can be implemented by electronic hardware, or a combination of computer software and electronic hardware. Whether these functions are performed in hardware or software depends on the specific application and design constraints of the technical solution. Those of ordinary skill in the art can use different methods to implement the described functions for each specific application, but such implementation should not be considered to be beyond the scope of this application.

If the functions are implemented in the form of software functional units and sold or used as an independent product, they can be stored in a computer-readable storage medium. Based on this understanding, an essential part of the technical solution of this application or, in other words, a part thereof that contributes to existing technology, or other parts of the technical solution can be embodied in the form of a software product. The computer software product is stored in a storage medium, including several instructions used for causing a computer device (which may be a personal computer, a server, or a network device, and the like) to perform all or part of the steps of the method described in some embodiments of the application. The foregoing storage medium includes various medium that can store program codes, such as a U disk, a mobile hard disk, a ROM, a RAM, a magnetic disk, or an optical disk.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed systems, devices, and methods may be implemented in other ways.

For example, the division of units or modules or components in some device embodiments described above is only a logical function division. In actual implementation, there may be another division manner. For example, multiple units or components may be combined or integrated to another system, or some features can be ignored or not implemented.

For another example, the above-mentioned units/modules/components described/displayed as separate components may be or may not be physically separated, that is, they may be located in one place, or may be distributed on multiple network units. Some or all of the units/modules/components can be selected according to actual needs to achieve the objectives of the embodiments of the application.

It should also be noted that the displayed or discussed mutual coupling or direct coupling or communication connection may be indirect coupling or communication connection through some interfaces, devices or units, which may be electrical, mechanical or in other forms.

The above content is only a specific implementation of the embodiments of the application, without limiting the protection scope of the embodiments of the application. Any modification or replacement conceived by those skilled in the art within the technical scope disclosed in some embodiments of the application should be covered within the protection scope of the embodiments of the application. Therefore, the protection scope of the embodiments of the application shall be subject to the protection scope of the claims.

What is claimed is:

1. A method for feeding back information, comprising:
    determining, by a terminal device, channel state information (CSI); and
    sending, by the terminal device, the CSI to a network device;

wherein the determining, by the terminal device, the CSI comprises:
determining, by the terminal device, a modulation and coding scheme, MCS level of downlink data,
determining, by the terminal device, a target MCS level,
determining, by the terminal device, a first difference value between the MCS level of the downlink data and the target MCS level, and
determining, by the terminal device, the CSI according to the first difference value,
wherein before the determining, by the terminal device, the CSI according to the first difference value, the method further comprises:
acquiring, by the terminal device, a difference value set, wherein the determining, by the terminal device, the CSI according to the first difference value comprises:
determining, by the terminal device, the CSI according to the difference value set and the first difference value.

2. The method according to claim 1, wherein the determining, by the terminal device, the target MCS level comprises:
determining, by the terminal device, the target MCS level by measuring a demodulation reference signal (DMRS), or a channel state information reference signal (CSIRS), or demodulation and decoding information.

3. The method according to claim 1, wherein the difference value set includes a difference value between the target MCS level and the MCS level of the downlink data, and wherein the determining, by the terminal device, the CSI according to the difference value set and the first difference value comprises:
determining, by the terminal device, the CSI including the first difference value.

4. The method according to claim 1, wherein the difference value set does not include a difference value between the target MCS level and the MCS level of the downlink data, and wherein the determining, by the terminal device, the CSI according to the difference value set and the first difference value comprises:
determining, by the terminal device, the CSI including a value in the difference value set closest to the first difference value.

5. The method according to claim 1, wherein the receiving, by the terminal device, a difference value set sent by the network device comprises:
acquiring, by the terminal device, the difference value set through a high layer signaling.

6. The method according to claim 1, wherein before the determining, by the terminal device, the CSI, the method further comprises:
acquiring, by the terminal device, a report set.

7. The method according to claim 1, wherein the CSI comprises a channel quality indicator (CQI).

8. The method according to claim 1, wherein a difference value between a channel difference corresponding to a step size of a CQI index and a channel difference corresponding to a step size of an MCS index is less than or equal to a preset threshold.

9. The method according to claim 8, wherein the preset threshold is zero.

10. A method for receiving information, comprising:
sending, by a network device, downlink data to a terminal device; and
receiving, by the network device, channel state information (CSI) sent by the terminal device,
wherein before the receiving, by the network device, the CSI sent by the terminal device, the method further comprises:
sending, by the network device, a difference value set to the terminal device,
wherein the difference value set is used by the terminal device to determine the CSI according to the difference value set and a first difference value, and the first difference value is a difference value between an MCS level of the downlink data and an MCS level determined by the terminal device.

11. The method according to claim 10, wherein the CSI includes the first difference value.

12. The method according to claim 11, wherein the acquiring, by the terminal device, the report set comprises:
receiving, by the terminal device, a physical layer signaling sent by the network device, wherein the physical layer signaling includes the report set; or
receiving, by the terminal device, a high layer signaling sent by the network device, wherein the high layer signaling includes the report set.

13. The method according to claim 10, wherein the CSI includes a value in the difference value set closest to the first difference value.

14. The method according to claim 10, wherein the sending, by the network device, the difference value set to the terminal device comprises:
sending, by the network device, the difference value set to the terminal device through a high layer signaling.

15. The method according to claim 10, wherein before the receiving, by the network device, the CSI sent by the terminal device, the method further comprises:
sending, by the network device, a report set to the terminal device.

16. A terminal device, comprising: a processor, a memory and a transceiver, wherein the processor, through calling and running a computer program from the memory, is configured to:
determine channel state information (CSI); and
send, via the transceiver, the CSI to a network device,
wherein the processor is specifically configured to:
determine a modulation and coding scheme, MCS level of downlink data,
determine a target MCS level,
determine a first difference value between the MCS level of the downlink data and the target MCS level, and
determine the CSI according to the first difference value,
wherein the transceiver is configured to:
acquire a difference value set,
wherein the processor is specifically configured to:
determine the CSI according to the difference value set and the first difference value.

17. The terminal device according to claim 16, wherein the transceiver is further configured to:
acquire a report set.

* * * * *